Oct. 24, 1939.　　　T. B. DOE ET AL　　　2,177,097
POWER TRANSMISSION
Filed Jan. 3, 1936　　　2 Sheets-Sheet 1

INVENTORS
THOMAS B. DOE
WILLIAM THOMAS
BY
ATTORNEY

Oct. 24, 1939.   T. B. DOE ET AL   2,177,097
POWER TRANSMISSION
Filed Jan. 3, 1936   2 Sheets-Sheet 2
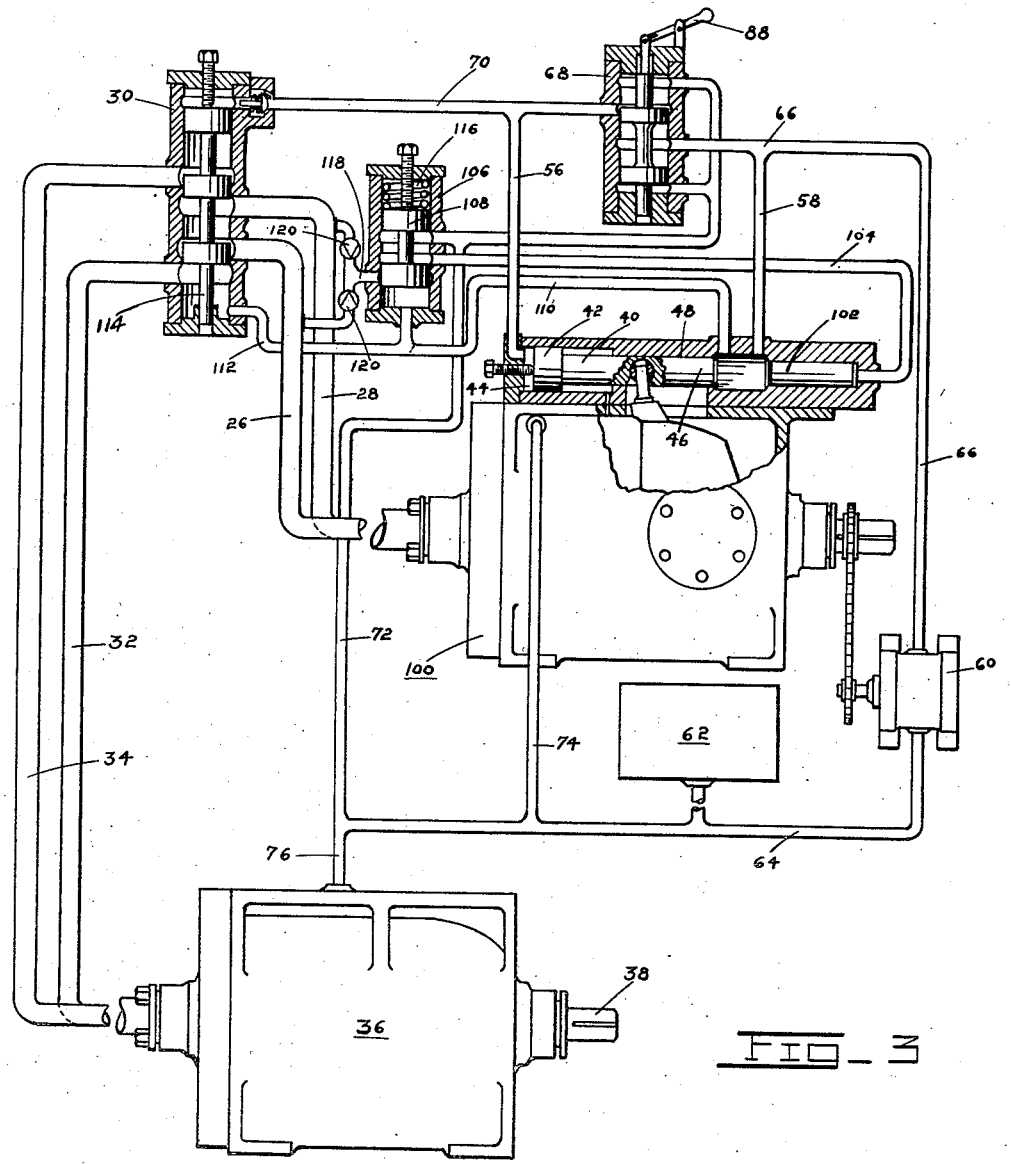
FIG_3
INVENTOR
THOMAS B. DOE
WILLIAM THOMAS
BY
Ralph L. Tweedale
ATTORNEY Patented Oct. 24, 1939

2,177,097

UNITED STATES PATENT OFFICE

2,177,097

POWER TRANSMISSION

Thomas B. Doe, New York, N. Y., and William Thomas, New Haven, Conn., assignors to The Waterbury Tool Company, Waterbury, Conn., a corporation of Connecticut Application January 3, 1936, Serial No. 57,358

9 Claims. (Cl. 60—53)

This invention relates to power transmission devices, particularly to those whereby it is possible to transmit power between a driving and a driven member at selectively variable speed ratios between the members. Transmission devices of this character are used for numerous purposes particularly where it is desirable to utilize a constant speed prime mover for driving a load device at selectively variable speeds. Transmissions of this character comprise usually a member which may be moved to vary the speed ratio between the driving and driven members. In certain applications apparatus is provided for operating this movable member hydraulically under the influence of a pilot control valve which may be operated manually or automatically. Under the severest service conditions, for example those found in military and naval apparatus, it is desirable to avoid the possibility of damage to the entire system when a part only of the system becomes disabled. Thus, for example should the hydraulic mechanism for controlling the speed ratio of the power transmission become disabled due to the failure of fluid pressure for any reason, it is desirable to insure the automatic return of the speed ratio varying member to a safe position regardless of its position at the time of the pressure failure. Otherwise control of the speed of the driven member is lost, and if the failure should occur while the driven member is operating at high speed, further damage may result from failure to stop the driven member at the proper time.

It is an object of the present invention therefore to provide a power transmission system in which the power transmission is automatically brought to a safe condition of operation when failure of the normal control system therefor occurs.

A further object is to provide a hydraulically operated control system for a variable speed power transmission which will operate to bring the power transmission to a safe condition of operation upon failure of the control system.

Further objects and advantages of the present invention will be apparent from the following description, reference being had to the accompanying drawings wherein a preferred form of the present invention is clearly shown.

In the drawings:

Fig. 3 is a diagrammatic view of a power transmission system embodying a second form of the invention.

Figure 2:
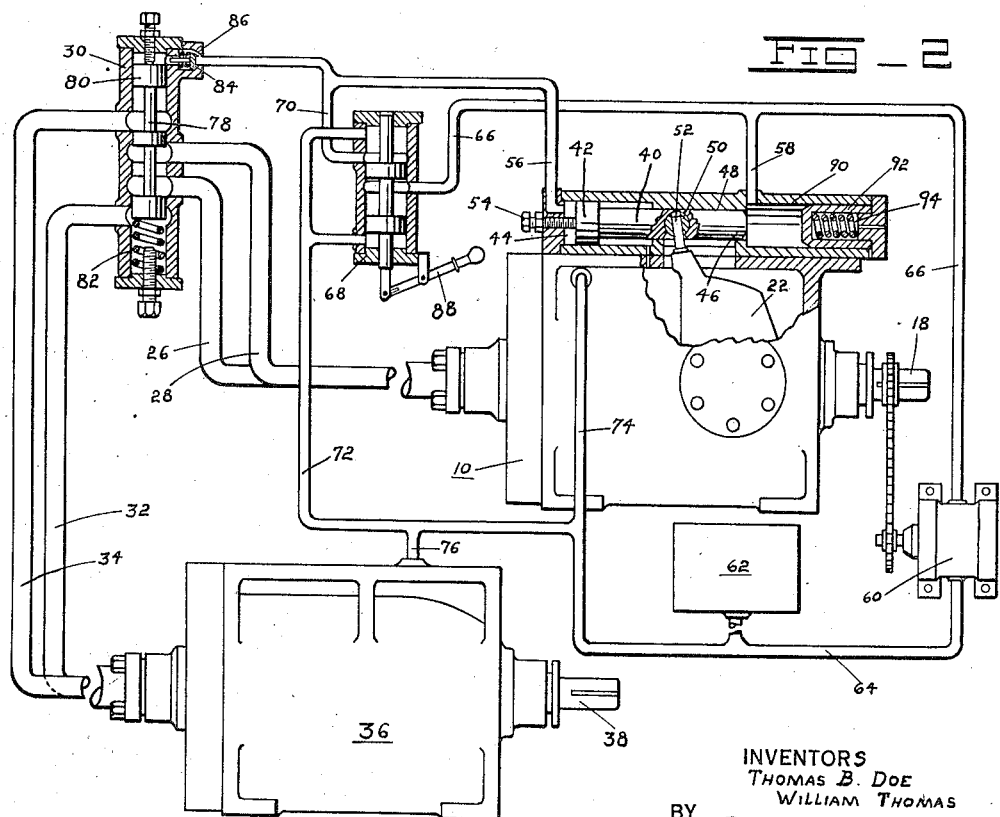
Fig. 2 is a diagrammatic view of a power transmission system according to the form of the invention illustrated in Fig. 1.

Referring now to Fig. 2, the invention is illustrated as embodying a variable speed transmission of the well-known Waterbury type comprising a variable displacement hydraulic pump, coupled by means of pressure and suction conduits to a fixed displacement motor. It is understood, however, that the invention is equally capable of embodiment with other types of variable speed transmissions both hydraulic and non-hydraulic.

Figure 1:
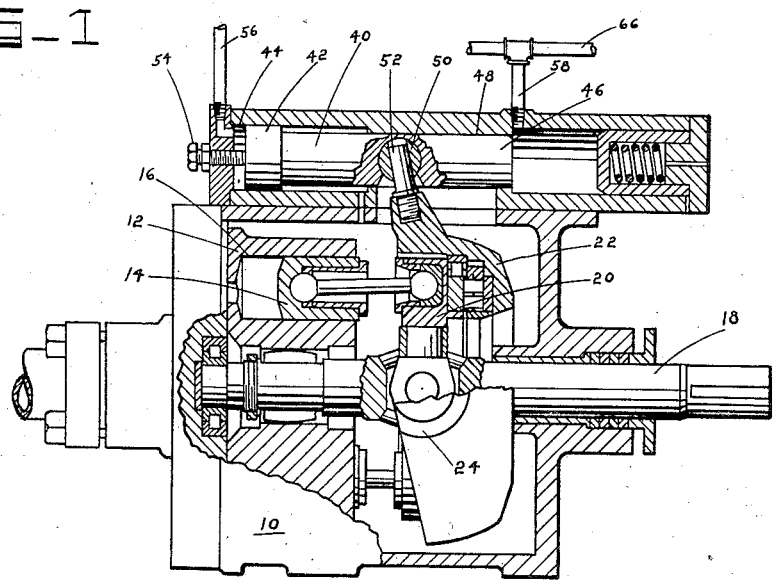
Fig. 1 is a fragmentary cross section of a portion of a power transmission embodying one form of the present invention.

The variable displacement pump 10, commonly referred to as the "A-end" includes briefly, as illustrated in Fig. 1, a revolving cylinder barrel 12 having pistons 14 reciprocable in cylinder bores 16. A driving shaft 18 drives the cylinder barrel 12, and also a socket ring 20 which is journalled in a tilting box 22. The displacement of the pump is varied by moving the tilting box 22 about its trunnions 24 to alter its angle of inclination to the shaft 18. The "A-end" 10 is connected by means of conduits 26 and 28 to a blocking valve 30 from which conduits 32 and 34 lead to a fixed displacement motor or "B-end" 36.

The internal construction of the "B-end" is similar to that of the "A-end" except that the socket ring revolves in a fixed angle-box rather than in a movable tilting box. The shaft 38 of the "B-end" may be connected to a load device, not shown, which it is desired to drive through the medium of the variable speed transmission from a prime mover, not shown, which may be suitably connected to rotate the shaft 18 of the "A-end" at a constant speed. The ratio between the speeds of the shafts 18 and 38 is determined by the position of the tilting box 22 which thus constitutes a member movable to determine the speed ratio of the power transmission.

Control of the position of the tilting box 22 is provided by means of a hydraulic control system comprising a differential piston 40 having a large end 42 movable in a bore 44 and a small end 46 movable in a bore 48. The piston 40 is connected to operate the tilting box 22 by means of a pivoting and sliding connection 50 to a pin 52 secured to the tilting box. A stop screw 54 adjustably limits the movement of the piston 40 to the left, thus determining the position of zero or minimum displacement of the "A-end". A conduit 56 is in communication with the bore 44 while a conduit 58 communicates with the small end 46 reciprocating in the bore 48.

Fluid under pressure for actuating the control piston 40 is provided by means of an auxiliary constant displacement pump 60 which may be of any well-known construction, for example a gear pump, incorporating a pressure relief valve, which pumps fluid from a tank 62 through a conduit 64 and into a conduit 66 which is permanently connected to the conduit 58. Conduit 66 further leads to a pilot control valve 68 which is operable to connect a conduit 70 either with the conduit 66 or with a conduit 72 leading to the tank 62. Conveniently the tank 62 may also be utilized as an expansion tank for the hydraulic transmission system and the conduit 72 may thus include branches 74 and 76 connected to the casings of the "A" and "B-ends", respectively, in a manner well-known in the art.

Conduit 70 connects with the conduit 56 and also to the upper end of the blocking valve 30. The latter is constructed to close communication between conduits 26 and 32 and also between conduits 28 and 34 in the position illustrated. The movable valve element 78 has an actuating piston 80 forming the top thereof by which fluid admitted from the conduit 70 may force the movable element 78 downwardly to open communication between the conduits 26 and 32 and 28 and 34, respectively. A spring 82 returns the valve to the position illustrated when pressure is relieved from the upper piston 80. A check valve 84 is interposed in the conduit 70 to provide free flow of fluid into the upper chamber of the valve 30 and is formed with a restricted passage 86 across its seat to limit the rate of flow of fluid out of the upper chamber. Movement of the pilot control valve 68, for example by a hand lever 88, thus controls the admission and exhaustion of fluid to the upper chamber of the valve 30 and also controls movement of the control piston 40 at the "A-end."

At the right hand end of the bore 48 there is an enlarged bore 90 within which a piston 92 is freely reciprocable. A spring 94 biases the piston 92 to the left. The force of the spring 94, however, is such that the normal pressure existing in conduit 58 is sufficient to compress the spring and hold the piston 92 in the position illustrated.

In operation assuming the shaft 18 of the "A-end" to be driven at a constant speed by its prime mover and that it is desired to start the load device which is driven by the shaft 38, the valve 68 is moved upwardly from the position illustrated by means of the hand lever 88, to place the conduit 70 in communication with the conduit 66 thus admitting fluid under pressure to the upper chamber of the valve 30 and to the bore 44 of the displacement regulating mechanism at the "A-end". The movable member 78 of valve 30 is thereby forced downwardly against the spring 82 to connect the conduits 26 and 28 to the conduits 32 and 34, respectively, and the control piston is moved to the right at a predetermined rate to increase the displacement of the "A-end" and thus increase the speed ratio between the shafts 18 and 38. The load device is thereby accelerated at a predetermined rate, until maximum speed is reached, when it continues to operate at that speed as long as lever 88 is held in the "go" position.

When it is desired to stop the load device, the pilot control valve 68 is returned to the position illustrated, thus placing the conduit 70 in communication with the tank 62 through conduit 72. This causes movement of the control piston 40 to the left, reducing the ratio of speed transmission. At the same time the movable member 78 of the control valve 30 is moved upwardly at a predetermined rate determined by the restricted passage 86 so that by the time the control piston 40 has reached the end of its travel or very soon thereafter, the valve 30 will cut off communication between conduits 26 and 32 and 28 and 34.

It will be understood that control piston 40 moves to the right when pressure is admitted to the conduit 56 due to the greater area of the piston 42 as compared with the area of the piston 46, both being subjected to equal pressures. The piston 40 moves to the left when conduit 56 is opened to the tank due to the pressure exerted on the end of the piston 46 alone.

Should a failure occur in the hydraulic control system especially while the load device is operating at full speed, the control piston 40 will be returned to the position illustrated by the piston 92. As soon as failure occurs, for example the bursting of a conduit in the control system or the failure of pump 60, pressure is relieved in the bore 90 permitting the spring 94 to force the piston 92 to the left, thus moving the control piston 40 into the safe position of minimum or zero displacement.

Referring now to Fig. 3, there is illustrated a second form of the invention wherein the fluid pressure developed within the main power circuit between the "A" and "B-ends" is utilized for moving the control piston to safe position upon failure of the normal control system.

In this form of the invention the "A-end" 100 is connected to the control valve 30 by conduits 26 and 28 from which the conduits 32 and 34 lead to the "B-end" 36 as in the construction previously described. The pump 60, the tank 62 and the pilot control valve 68 are connected in the circuit in the same manner as previously described. In place of the spring biased piston 92, however, a fluid operated piston 102 is provided at the right hand end of the control cylinder and is normally maintained in the position illustrated by fluid pressure from the pump 60 delivered through the conduit 58. The right hand end of the piston 102 is under the influence of fluid admitted through a conduit 104 leading from an emergency control valve 106. The movable element 108 of the valve 106 has a lower piston which is subjected at all times to the pressure from the pump 60 through a conduit 110. Conduit 110 has a branch 112 leading to the lower portion of the blocking valve 30 which acts in place of the spring 82 to raise the valve 30 when pressure is relieved in the upper chamber thereof, the rod 114 acting to limit the area over which the fluid pressure is exerted as compared to the area upon which the same pressure is exerted in the upper chamber.

The movable element 108 is biased downwardly by a spring 116 which, however, is of insufficient strength to overcome the normal pressure exerted on the bottom piston by the fluid delivered from pump 60. When this fluid pressure fails, however, the movable element 108 of valve 106 drops, thus placing the conduit 104 in communication with a conduit 118 which is in communication through oppositely acting check valves 120 with each of the conduits 26 and 28. The right hand end of piston 102 is therefore subjected to the highest pressure existing in either conduit 26 or 28 whenever the control valve 106 is in the lower position, and is maintained in communication with the tank 62 through conduit 72 when valve 106 is in the upper position.

The operation of this form of the invention under normal conditions is otherwise identical to that previously described. Upon a failure of the normal control system, however, the movable member 108 of valve 106 is moved downwardly under the influence of spring 116 and fluid from the main hydraulic power circuit is admitted through one of the check valves 120 and conduit 104 to the right hand end of the piston 102. Since there is no pressure in the bore 44, piston 102 moves to the left, and forces the control piston 40 into the position illustrated, thus bringing the transmission into a safe operating condition.

While the form of embodiment of the invention as herein disclosed, constitutes a preferred form, it is to be understood that other forms might be adopted, all coming within the scope of the claims which follow.

What is claimed is as follows:

1. In a power transmission device the combination of a driving shaft, a driven member, a variable speed transmission intermediate the driving shaft and the driven member, double acting fluid pressure operated means for increasing and decreasing the ratio of power transmission to drive the driven member at higher and lower speeds, and additional means normally inoperative and rendered operative upon failure of the first mentioned means for changing the ratio of power transmission to prevent continued operation of the driven member at high speed.

2. In a hydraulic power transmission a variable displacement pump, a hydraulic motor, a member movable to vary the displacement of the pump, an auxiliary device forming a source of fluid under pressure, means fed by said auxiliary device for moving the movable member in opposite directions, and means normally maintained inoperative by said auxiliary device for moving the movable member toward zero displacement.

3. In a hydraulic power transmission a variable displacement pump, a hydraulic motor, a member movable to vary the displacement of the pump, an auxiliary device forming a source of fluid under pressure, means fed by said auxiliary device for moving the movable member in opposite directions, and means normally maintained inoperative but responsive to a predetermined drop in pressure from said auxiliary device for moving the movable member toward zero displacement under the influence of fluid pressure developed by said pump.

4. In a hydraulic power transmission a variable displacement pump, a hydraulic motor, a member movable to vary the displacement of the pump, an auxiliary device forming a source of fluid under pressure, means fed by said auxiliary device for moving the movable member in opposite directions, and means normally maintained inoperative but responsive to a predetermined drop in pressure from said auxiliary source for moving the movable member toward zero displacement.

5. In a hydraulic power transmission a variable displacement pump, a hydraulic motor, a member movable to vary the displacement of the pump, an auxiliary device forming a source of fluid under pressure, a second hydraulic motor for moving said movable member, valve means for controlling the admission and exhaust of fluid to the second hydraulic motor to increase or decrease the displacement of the pump, a piston associated with the second hydraulic motor and operable to move said movable member toward zero displacement, said piston being normally held in inoperative position by fluid pressure from said auxiliary device, and means for moving the piston upon failure of pressure from said source.

6. In a hydraulic power transmission a variable displacement pump, a hydraulic motor, a member movable to vary the displacement of the pump, an auxiliary device forming a source of fluid under pressure, a second hydraulic motor for moving said movable member, valve means for controlling the admission and exhaust of fluid to the second hydraulic motor to increase or decrease the displacement of the pump, a piston associated with the second hydraulic motor and operable to move said movable member toward zero displacement, said piston being normally held in inoperative position by fluid pressure from said auxiliary device, and resilient means for moving the piston upon failure of pressure from said source.

7. In a hydraulic power transmission a variable displacement pump, a hydraulic motor, a member movable to vary the displacement of the pump, an auxiliary device forming a source of fluid under pressure, a second hydraulic motor for moving said movable member, valve means for controlling the admission and exhaust of fluid to the second hydraulic motor to increase or decrease the displacement of the pump, a piston associated with the second hydraulic motor and operable to move said movable member toward zero displacement, said piston being normally held in inoperative position by fluid pressure from said auxiliary device, and means for moving the piston by fluid from the pump upon failure of pressure from said source.

8. In a hydraulic power transmission a variable displacement pump, a hydraulic motor, a member movable to vary the displacement of the pump, an auxiliary device forming a source of fluid under pressure, means fed by said auxiliary device for controlling the position of the movable member, and energy-storing means for moving the movable member toward zero displacement, and additional pressure responsive means for maintaining stored energy in the energy storing means independently of the position of the movable member.

9. In a power transmission device the combination of a driving shaft, a driven member, a variable speed transmission intermediate the driving shaft and the driven member, double acting fluid pressure operated means for increasing and decreasing the ratio of power transmission to drive the driven member at higher and lower speeds, and additional means normally inoperative and rendered operative upon failure of the first mentioned means for changing the ratio of power transmission to prevent continued operation of the driven member at high speed, the last said means being operable by energy delivered by the power transmission itself.

THOMAS B. DOE.
WILLIAM THOMAS.